Sept. 5, 1939.  F. S. MEYER  2,171,759

METHOD FOR PREPARING DENTAL RESTORATIVES

Filed Nov. 2, 1936  4 Sheets-Sheet 1

Inventor
Frederick S. Meyer
By Williamson & Williamson
Attorneys

Sept. 5, 1939.   F. S. MEYER   2,171,759
METHOD FOR PREPARING DENTAL RESTORATIVES
Filed Nov. 2, 1936   4 Sheets-Sheet 2

Inventor
Frederick S. Meyer
By Williamson & Williamson
Attorneys

Sept. 5, 1939. F. S. MEYER 2,171,759
METHOD FOR PREPARING DENTAL RESTORATIVES
Filed Nov. 2, 1936 4 Sheets-Sheet 3

Inventor
Frederick S. Meyer
By his Attorneys
Williamson & Williamson

Sept. 5, 1939.   F. S. MEYER   2,171,759
METHOD FOR PREPARING DENTAL RESTORATIVES
Filed Nov. 2, 1936   4 Sheets-Sheet 4
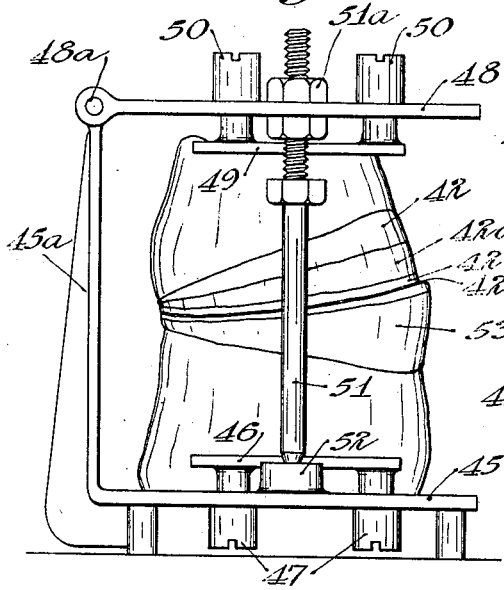
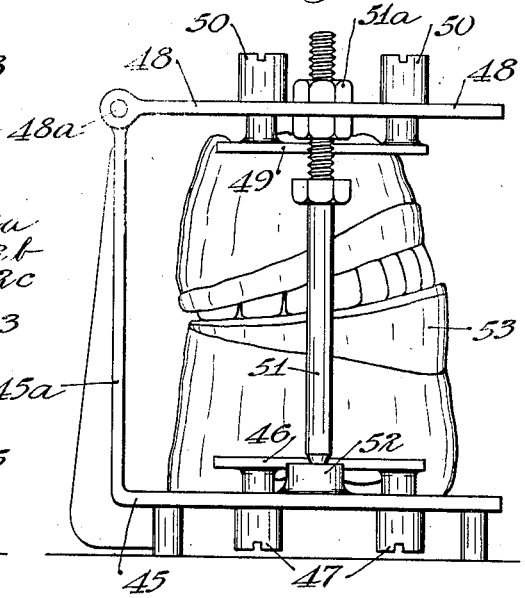
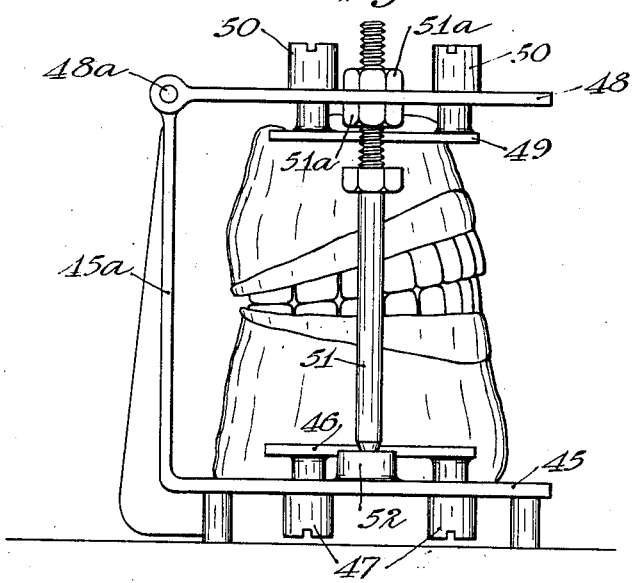
Inventor
Frederick S. Meyer
By his Attorneys
Williamson & Williamson Patented Sept. 5, 1939

2,171,759

UNITED STATES PATENT OFFICE 2,171,759

METHOD FOR PREPARING DENTAL RESTORATIVES

Frederick S. Meyer, Minneapolis, Minn.

Application November 2, 1936, Serial No. 108,905

4 Claims. (Cl. 32—2)

This invention relates to an improved method for preparing dental restoratives of all removable types, particularly plates for upper or lower jaws, or both, in a case of edentulous mouth. The present application is a continuation in part of my copending application No. 614,357 filed May 31, 1932, and now matured into Patent No. 2,059,262. The subject matter of this present application, which was divided from my said original application, applies particularly to my method for preparing full restoratives for an edentulous mouth.

My present invention has for an object, to provide a comparatively simple, highly accurate method for making and preparing artificial dentures for partially edentulous and for edentulous mouths to secure a balanced and functional occlusion which approach closely the masticating and biting functions of which the finest type of human teeth are capable.

With methods and techniques extensively utilized before the discoveries set forth in my copending application, Serial No. 614,357, balanced and functional occlusion in artificial dentures of the type referred to was, to a considerable extent, a matter of chance and largely resulted from guess work and was approximated only by the use of complicated articulators and highly specialized techniques in the taking of "bites", and then to obtain approximate results usually required much spot grinding of the dentures after they were installed in the mouth. The correct functioning of such dentures in lateral and protrusive excursions of the mandible was very seldom realized when the teeth were put to the real test in mastication.

With my improved methods or techniques, all possible movements of the patient's mandible are taken advantage of to determine the functional and balanced occlusal path required. The complicated articulators and guess work, and calculation by guess work are substantially dispensed with and full or partial plates both for the upper and lower jaw as well as a set of plates for edentulous mouth may be obtained wherein functional occlusion and the various mandibular movements of mastication are obtained, and where furthermore, with later improvements I have made since filing my original application, Serial No. 614,357, cusps of the upper and lower teeth contact in the various mandibular movements as they do in natural teeth of the finest type. My improved method makes provision for the reproduction of teeth to upper and lower jaws, or both, where a compound curve from a horizontal plane is necessary to produce true functional occlusion and proper contact of the cusps as well as where, as in many instances, only a single curve of the line defined by the tooth extremities is necessary.

These and other objects and advantages of the invention will be more fully set forth in the following description made in connection with the accompanying drawings, wherein like reference characters refer to the same or similar parts throughout the various views, and in which:

Figs. 1-5 inclusive illustrate various steps in the production of a full or partial plate for one of the jaws, some of which steps are utilized in preparation of a set of plates for an edentulous mouth.

Fig. 1 is a perspective view showing a bite rim constructed from compound including the compound ridges formed by the sulci of the opposing teeth.

Fig. 2 is a perspective view showing the same bite rim or trial plate widened to some extent, and having the occlusal surface thereof covered with softer impression material, said view showing the bite rim after the cusps and sulci of the opposing or natural teeth have been checked and treated and after the functional occusal path has been generated in the soft material, reproducing the true ridges and contours for the cusps and sulci of the restorative.

Figure 1:
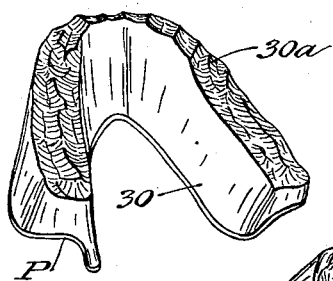
Figure 3:
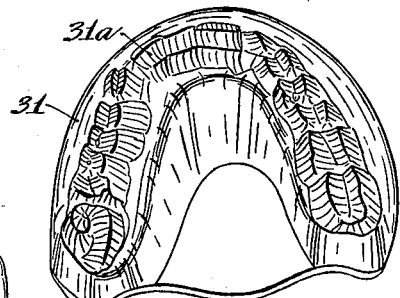
Fig. 3 is a perspective view showing a relatively hard or stone counterpart made from the occlusal contour of the trial plate or bite rim shown in Fig. 2.

Figs. 10-21 inclusive illustrate in side and front elevation, the actual functional relations of several artificial dentures which I have constructed in accordance with my method, in each instance, the restorative being a complete plate for the lower arch.

Figs. 22-29 inclusive illustrate a number of steps of my method as applied to the preparing of full dentures (both upper and lower plates for an edentulous mouth).

My method is based on the correct assumption that with a given length of upper and lower teeth and a given bite opening, there is a path between the opposing teeth at which, if the teeth are set thereto, they will function properly with the condyle working in the glenoid fossa. Hence, the two will work in harmony. If this path does not conform to the path generated by the movements of the mandible, then a slight change in the angle of the cusps will make up the deficiency. This change can only be produced by the generating of the path that these teeth travel in, in each individual case. At a given length of the upper teeth already in place, it is to be assumed that in the various mandibular movements, these cusps travel in a certain path at a given bite opening, that if this path is registered in the opposing teeth and the cusps of the opposing teeth meet this path, they must in necessity function with the teeth already in place.

Referring first to my method as applied to the preparation of partial dentures and full lower or upper dentures, in other words, where a dentist is building to the teeth which are in the opposing dental arch, my method as illustrated in Figs. 1–21 inclusive, consists essentially of the following described steps:

Where, hereafter in describing my method the term "sulci" is used, it is used in the broad sense to include fossae as well as the actual sulci.

A stone model is prepared from the dental arch to be restored. This may be made in the usual manner by taking an impression from the appropriate arch or ridge and pouring a stone casting from the impression so taken. As illustrated in the drawings, Figs. 1–9a inclusive, a full restorative for the lower dental arch is being made. A base plate P and bite rim 30 is built on the stone model, the bite rim preferably constructed of a black compound, because black can be more easily seen through a thin layer of pink wax, and this compound bite rim is built up to the vertical dimensions desired. It is best to form the compound bite rim on the wet stone cast of the ridge before tacking it on the base plate. This is to avoid distortion of the bite rim due to the heat of the compound. The compound used for the bite rim is of such material that it will not soften or become distorted at mouth temperature. The trial plate comprising the base plate and compound bite rim is placed in the patient's mouth and contoured for facial expression to be sure of correct vertical dimensions. A warm, soft compound is traced over the occlusal surface (preferably done while the bite rim is on the cast). The trial plate is then transferred into the patient's mouth, and the patient is required to bite into it in centric relation. When the compound is cooled to mouth temperature, the trial plate or bite rim is removed and cut away down to the level of the cusp indentations from the upper teeth, only the ridges of compound that fit up into the sulci and interproximal spaces of the upper teeth as at 30a (see Fig. 1) remaining. It is desirable to replace the trial plate in the mouth after adding a slight amount of soft compound over the compound ridges, previously produced on the occlusal aspect and the patient repeats the bite in centric relation forming a more correct impression because at this time there is not a large amount of compound to force the mandible out of the rest position. The compound is thinned away as before, and checked for centric occlusion. If the patient can consecutively open and close in centric occlusion, with the teeth of the upper arch fitting into the same indentations in the compound, the dentist is sure that true centric has been obtained and is then ready to analyse the opposing cusps and sulci.

With my technique or method it becomes possible to know before a single tooth is inserted in the trial denture what can be accomplished in balanced occlusion when the denture is completed.

Figure 2:
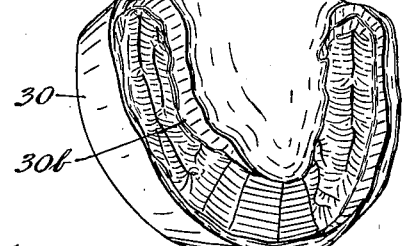
Figure 4:
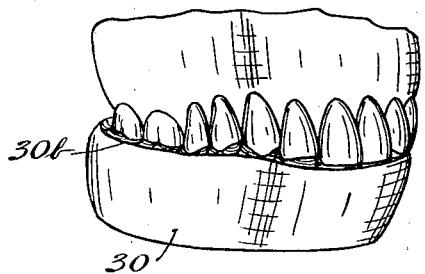
Fig. 4 is a view in side perspective showing the manner in which the path and impressions are formed in the soft impression material on the bite rim by the mandibular excursions of the opposing teeth.

The compound bite rim 30 with the indentations and ridges 30a formed by the cusps and sulci of the opposing human teeth is widened, say three or four m. m., at the level of the cusp indentations as shown in Fig. 2, and is then replaced in the mouth after softening by heat, and the patient is asked to make lateral excursions of the mandible. I prefer to have the patient first make a lateral excursion in one direction until the compound ridge below is opposite to or touches the bucal cusps above on the same side, and the patient holds the teeth in that position for examination. If some of the compound ridges below fail to touch the upper bucal cusps on the masticating side, then some necessary corrections must be made to bring them into contact. If none of the compound ridges touch, I look to the opposite side for too long lingual cusps on the upper teeth or it may be that the sulci of the upper teeth on the opposite side are too deep, or the compound ridges extending into the interproximating spaces may interfere. The cusps of the upper teeth are slightly trimmed off or the sulci are filled in. The process of biting into compound and analysing the opposing cusp is repeated until the compound ridge no longer prevents the compound from touching the cusps of the opposing teeth on the masticating side. Lateral excursions are made by the patient to both sides and the interfering lingual cusps are trimmed off until there is contact on both sides. If the majority of the cusps touch the compound ridges, but one cusp fails to touch it, it means that the sulcus is too shallow and the sulcus must be deepened the amount that the cusp fails to touch. Some small amount of soft compound is added to the bite rim at the point opposite where the sulcus has been deepened, and the patient closes into it again. The trimming and lateral excursions are repeated and again checked. Biting into the soft compound and trimming and checking for contact of the cusps for the compound ridges is repeated until in the lateral excursion all the compound ridges on the working side, with at least one or more of the cusps on the balancing side touch or contact the opposing cusps. In cases where all of the cusps of the teeth touch an arc approaching that of a sphere, or in other words, where a single curve condition exists, all the cusps on both sides should touch the compound ridges opposing them when a lateral excursion is made. When aesthetics demand an overjet of the anterior teeth greater than one-half of the width of the bicuspid teeth, then the natural teeth in the mouth will not have their cusps all touch an arc approaching that of the sphere and a compound curve is present in the natural teeth and must be reproduced in the artificial denture and only a three point balance is possible in a lateral excursion. That is, when the upper and lower cusps on one side are in working position and in contact, only one or more cusps on the opposite side of the arch may contact. In the analysis of the cusps and the sulci of the opposing teeth, the mandibular movement of the patient in protrusion is also an important factor. In the protrusive excursions, the compound ridges in the bicuspid region must not touch the cusps of the opposing teeth before those ridges in the molar region and the cusps and sulci of the opposing teeth may thus be so prepared that such functioning can properly take place. The compound ridge opposing the six anterior teeth must be so arranged and so trimmed away that only in centric relation will this compound ridge touch any of the opposing anterior teeth.

Figure 5:
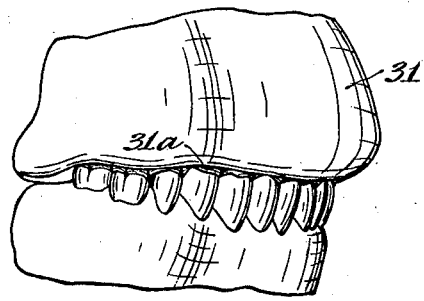
Fig. 5 shows the manner in which the artificial teeth are set up and the cusps and sulci formed in conformance with the path produced on the stone casting of Fig. 3.

Having analysed and properly prepared the cusps and sulci of the opposing teeth and having formed the compound ridges, as in Fig. 1, then the bite rim is thinly covered with a mixture of soft carding wax and base plate wax to the depth of the compound ridges. The bite plate is then replaced in the patient's mouth and the patient is required to bite into this wax and make all lateral excursions as well as the protrusive excursions. This generates the correct path of the occlusal surfaces of the opposing teeth in the wax. The counterpart of this carefully determined occlusal path is poured in stone, forming the cast or model 31, shown in Fig. 3, reproducing the path of the cusps and sulci of the opposing teeth. Artificial teeth are then set up in wax and ground to this stone path 31a and these teeth are carefully checked for alignment and aesthetics with the opposing teeth in the mouth. Fig. 5 is a perspective view showing the artificial teeth set up to the irregular occlusal path formed by the stone model 31.

Figure 6:
Figs. 6 and 7 are fragmentary, diagrammatical views illustrating the manner in which the impression material is shaped and formed in the mandibular movements of the patient.
Figure 7:
Figure 8:
Figs. 8, 9 and 9a are fragmentary, diagrammatical views showing engagement of the cusps in centric occlusion and in lateral excursions of the mandible.
Figure 9:
Figure 9A:

Figs. 6 and 7 show how one of the ridges and the path about the same is generated in the soft wax on the built up plate by the lateral excursion of one of the opposing natural molars. The Figs. 8, 9 and 9a show the positions of the upper molar to the lower in centric occlusion, in a lateral excursion on the balancing side and in Fig. 9a the opposing molars on the masticating side.

Figure 26:
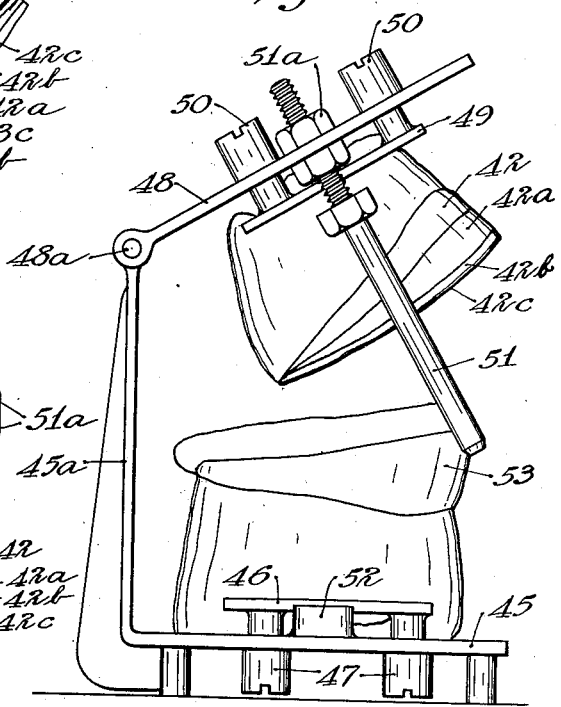
Figure 25:
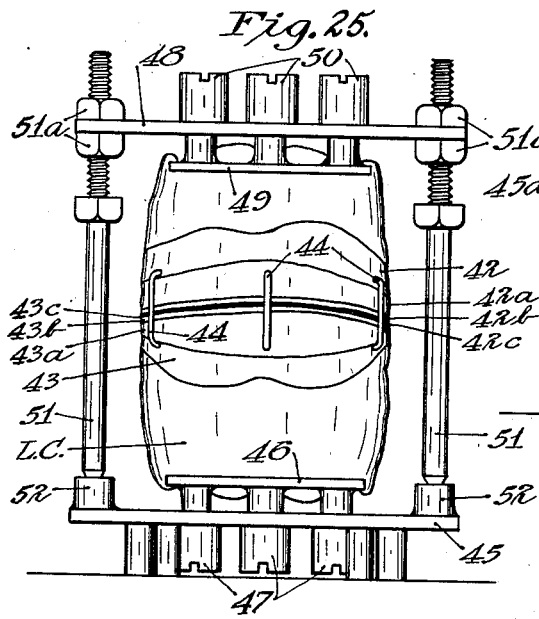

When alignment of the artificial dentures has been checked and corrected, the occlusal surfaces of the artificial teeth are ground to fit surface to surface with the stone path 31a. This is preferably accomplished by covering the stone path with Prussian blue thinned with water or oil. In checking to determine grinding, the teeth are mounted in a plane line articulator such as is illustrated in Figs. 25 and 26 of the drawings and later described with reference to my method applied to restoratives for an edentulous mouth. When the teeth mounted on a plane line articulator are brought into contact with the blue stone path, they are spotted and the spots may be ground away until all the occlusal surfaces of the artifical teeth are covered with blue on closing at the desired predetermined bite opening which is maintained by vertical adjusting of the articulator. The occlusal surfaces of the restored teeth are then such as to function and balance accurately with the opposing teeth in all excursions of the mandible as well as in centric relation.

After the artificial teeth have been set up in wax and the cusp and sulci surfaces properly ground, the denture is completed in the usual manner.

Figure 10:
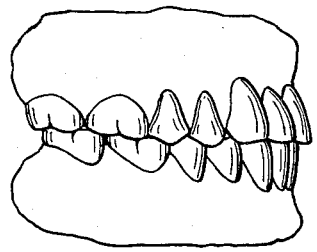
Figure 11:
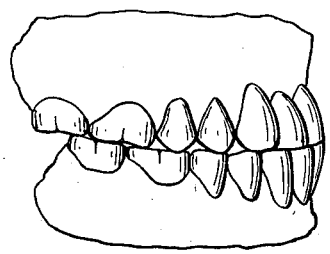
Figure 12:
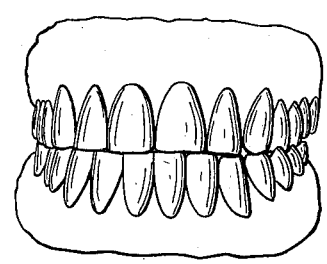

Figs. 10–21 show accurate reproductions of several actual cases where I have prepared the restorative and further illustrate the accurate functional contacting of the teeth with the artificial dentures during the several mandibular movements. In each instance shown, the restorative is a full restorative for the lower arch. In Figs. 10–12 inclusive, the natural teeth are such that the cusps lie substantially in a single curved path. Fig. 10 shows the cusps of the upper and lower artificial teeth in centric occlusion. Fig. 11 is a similar side view showing the same teeth in protrusion of the mandible with incisors in operating contact. Fig. 12 shows the protrusive bite from the front view, showing the contacting of the cusps with the opposing teeth throughout.

Figure 13:
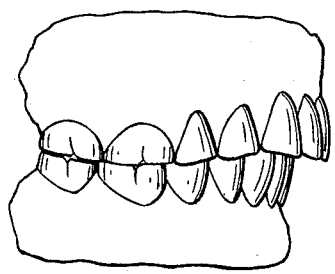
Figure 14:
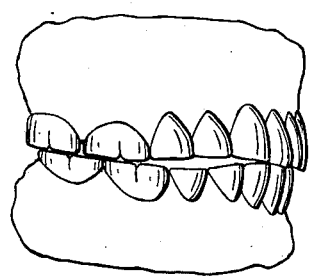
Figure 15:
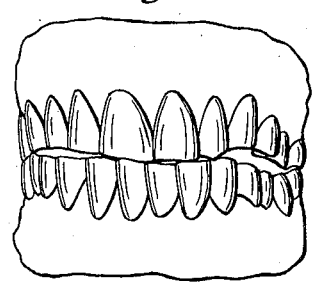

In Figs. 13–15 inclusive is shown the relation of the upper and lower teeth where the teeth have their cusps disposed in a compound curved surface which occurs in cases where a considerable overbite and overjet is present. Fig. 13 shows centric occlusion of the restorative and teeth where flattened cusps are formed rather than the normally ridged cusps shown in Figs. 10–12. Fig. 14 shows the same teeth when the protrusive bite is taken (side view), and Fig. 15 shows the same teeth in a protrusive bite from the front.

Figure 16:
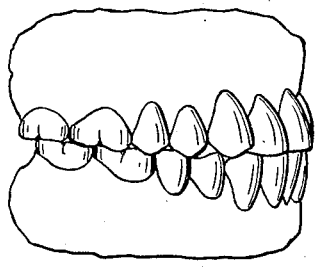
Figure 17:
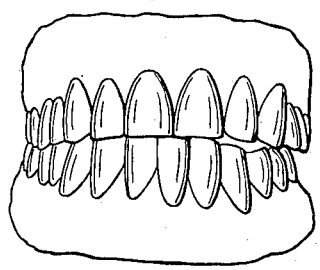
Figure 18:
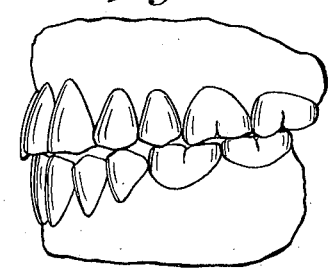

Figs. 16–18 show two side views and a front view of teeth with cusps in single curve relation when a lateral excursion of the mandible is made to the right. The contacting of the several cusps for mastication may be observed. You see the contacting of the upper and lower bucal cusps on the right side and the upper lingual with the lower bucal cusps on the opposite side.

Figure 19:
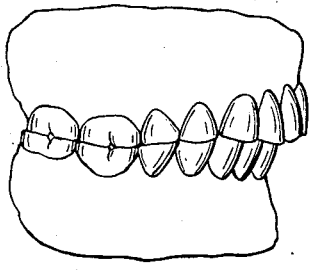
Figure 20:
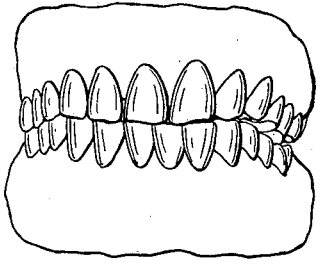
Figure 21:
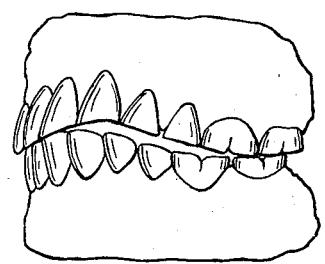
Figure 22:
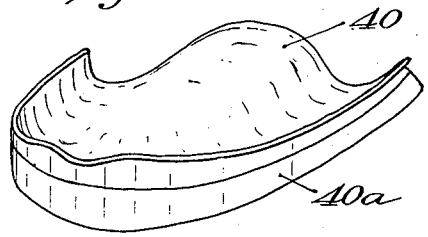

Figs. 19–21 inclusive illustrate additional views of the case illustrated in Figs. 13–15, which teeth lie in a compound curved surface. In Figs. 19–21 the said teeth with flattened cusps are shown in right lateral excursion respectively from the masticating or right side, the front and the balancing or left side.

I wish to state here that whether you have conditions requiring a simple curve or a compound curve, the restoratives may be accurately and functionally constructed with either normal cusps and sulci or with flattened occlusal surfaces such as are illustrated in Figs. 13–15.

With my method, guess work is eliminated and an accurate technique makes possible the knowledge before a single tooth is inserted in the trial denture as to just what may be accomplished by way of balanced occlusion and function before the denture is completed.

In Figs. 22–29 inclusive, the main or important steps of my method applied to the preparation of a set of full dentures is illustrated. The produc- of the "functional occlusal path" and preparation of plaster models is broadly similar to the corresponding steps in the method applied to the preparation of bridges.

In preparing the plates for an edentulous mouth, I first construct plaster models or casts of the upper and lower jaws and any of the approved, conventional techniques may be employed to obtain these casts.

I then prepare a pair of trial plates 40 and 41 (see Fig. 22), comprising base plates constructed from any suitable base plate material, and said base plates are covered on the opposing surfaces with bite rims 40a and 41a respectively, said bite rims being preferably constructed from a relatively hard wax or compound. The bite rims are built out for contour and height in any of the conventional manners and the trial plates so constructed are tried in the mouth for facial expression and proper height of the bite rims and an approximate balance in all the mandibular movements.

Figure 23:
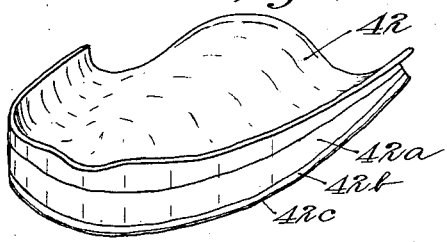
Figure 24:
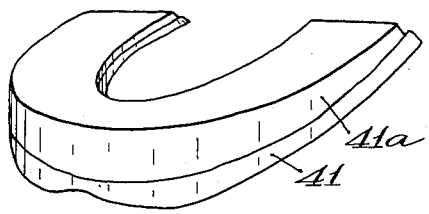
Figure 24:
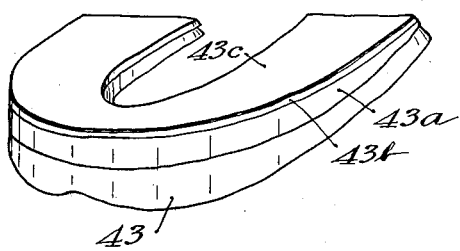
Figure 24:
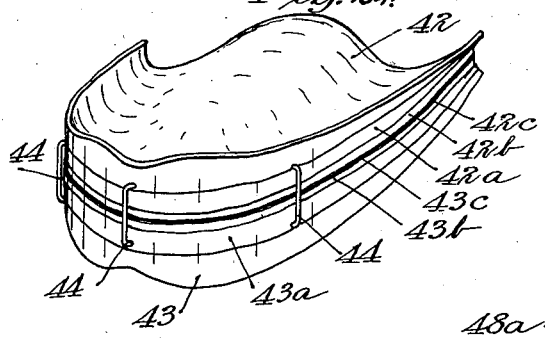

My next step is to prepare a pair of functional trial plates. These may consist in conventional base plates 42 and 43, as shown in Fig. 23, having their opposing surfaces covered with bite rims 42a and 43a respectively, broader than the bite rims of the trial plates, but of less height. The bite rims 42a and 43a may also be constructed of hard wax or other suitable composition. The functional bite rims so constructed are each covered with a thin layer of soft pliable wax (two or three thicknesses of carding wax may be utilized) 42b and 43b respectively. Contour is not necessary on these functional plates. The soft wax coverings 42b and 43b respectively are covered with sheets of heavy tin foil 42c and 43c and the tin foil is preferably smeared with vaseline or other lubricant and nicely smoothed against the soft wax. The functional trial plates so prepared are then put into the patient's mouth, fitted into place, and the patient is then requested to perform all the movements of the mandible of which he is capable while compressing the plates together. These many various mandibular movements conjointly produce or define paths or contours on the opposing surfaces of the two functional plates by compression, which paths I term the "balanced functional occlusal paths". The mandibular movements are continued until the upper and lower bite rims are in continued contact throughout all the movements. If after continuing these movements until all the occluding surfaces are in contact, either the upper or the lower bite rim or both should prove to be of insufficient height, as compared with the original trial plates, then more carding wax is added and the process repeated, or if any of the hard wax or composition should appear through the soft carding wax, this hard compound underneath the carding wax is cut away and the process is repeated. Centric relationship of the two functional trial plates is obtained in the patient's mouth and the functional trial plates are then tied together, as shown in Fig. 24 by suitable means, such as the staples 44 and the tied plates are then removed together. The lower plaster model or cast LC, see Fig. 25, is mounted in its proper position in a plane line or simple hinged articulator. The articulator illustrated in Figs. 25 and 26 comprises a horizontal base 45 to which a metallic plate 46 embedded in the cast may be detachably secured by screws 47. Base 45 rigidly carries an upstanding arm 45a to which the upper element or support 48 of the articulator is hinged, said hinge connection being made on an axis 48a. The upper element 48 is adapted to detachably hold a metallic plate 49 embedded in the upper plaster cast and said plate may be secured to element 48 by means of suitable screws 50. Adjustable stop rods 51 depend from the hinged articulator element 48 and are adapted to engage lugs 52 formed on the top of base 45 to limit the downward swinging of element 48. Adjustment may be made by threading the upper ends of stop rods 51 and applying jamb nuts 51a to the projecting upper ends above the hinged articulator element 48.

The lower functional trial plate is placed in position on the lower cast mounted in the articulator with the upper functional trial plate still tied thereto. The upper cast is then placed in position in the upper functional trial plate, thus determining the position of the upper plaster cast in the articulator in relationship to the lower. The upper cast is then mounted in the articulator by embedding the hinged element 48 in the plaster.

My next step is to prepare functional plaster bite plates from the functional trial plates and to do this, I preferably construct base plates, the lower of which, No. 53, is shown in Fig. 26, constructed in the conventional manner, and I form thereon a plaster containing rim of compound, said rim being of less height than the rim of the first trial plate forming a trough into which soft plaster can be poured. Soft plaster is then poured into the said trough after which the articulator is closed with the upper functional trial plate in place reproducing the bite rim or functional occlusal surface in plaster on the lower plaster plate. The upper plaster functional plate is prepared from the lower functional trial plate in the same manner.

The lower plaster plate formed as above described is now placed in position on the cast and the upper trial plate is placed in position on the upper cast, see Fig. 27. The contour of the bite rim is then outlined on the plaster plate from the contour line of the upper trial plate and the artificial teeth are set up in the trial plate to conform to the contour line and to conform perfectly to the surface or functional occlusal path of the plaster functional plate, as shown in Fig. 28. The cusps of the teeth are ground to approximately flat surfaces to conform to said functional occlusal path. This determines the location and setting of the teeth in the upper plate. The teeth on the lower trial plate are set up in alignment with the teeth which have been set up upon the upper trial plate and the occlusal path or surface is corrected by placing the upper plaster functional plate in contact with the teeth set up on the lower trial plate, the straight line articulator being utilized.

The trial plates with the teeth set up thereon are usually tried in the mouth for further proper alignment of the teeth and expression, etc. The finished set of plates is then produced from the set up trial plates in the laboratories in any of the approved conventional manners.

If artificial teeth having cusp formation are desired, then the prepared cusp teeth for the upper plate are set to the lower plaster plate 53 and a new trial plate or bite rim is formed and prepared and the ridges and sulci depressions constructed in the manner described with reference to my method as applied to partial dentures or a full plate for the upper or lower arch. The cusps of the artificial teeth and the ridges of the compound material and the attendant ridges on the occlusal surface of the wax formed on the compound material, as shown in Figs. 1 and 2, being reproduced from the cusps and the changed cusps and sulci of the artificial upper teeth. In such instance true functional relationship for protrusive bite and the lateral excursions is obtained for the restoratives for an edentulous mouth.

From the foregoing description it will be seen that with my method the dentures so produced will have substantially accurate functional occlusal relationship. There can be no interfering cusps, since the occlusal lines of the teeth have been actually set to the functional occlusal path defined or traced upon trial plates by the mandibular movements of the human jaw. The functional occlusion will be moreover accurately balanced whereby all points of the upper and lower teeth which touch will be under substantially equal pressure.

It will, of course, be understood that various minor changes may be made in the steps and sequence of steps of the method without departing from the scope of my invention which, generally stated, consists in a method capable of carrying out the objects herein set forth, such as disclosed and defined in the appended claims.

What is claimed is:

1. The steps in the method of preparing dental restoratives which consists in constructing first a pair of trial plates consisting in base plates and bite rims modelled from plaster casts of the upper and lower jaws and building up for contour and height, said bite rims in conventional manner then constructing a set of functional trial plates from said plaster casts which accurately fit the respective arches of the mouth and having bite rims approximating the height and contours of said first mentioned trial plates and constructed from materials which will not soften at mouth temperature, covering said functional bite rims each with a layer of relatively soft plastic material, covering the occlusal surfaces of said soft material of both functional trial plates with sheets of pliable ductile material, accurately placing the functional trial plates so made in the patient's mouth, shaping and moulding by all possible mandibular movements of the patient a predetermined functional occlusal path on the occlusal surfaces of the soft coverings of said functional bite rims, comparing the heights of said soft coverings after all opposing occlusal surfaces are in contact, correcting the said heights with the heights of said original trial plates and continuing to reshape and mould said path by all mandibular movements of the patient until all of the occlusal surfaces of the two functional bite rims touch at the desired height, and reproducing the functional occlusal surfaces of said two functional trial plates in hard material by molding.

2. A method of preparing artificial dentures of the type built to whatever natural or artificial dentures are in the mouth, which consists in first constructing a trial bite plate formed upon a cast of one of the patient's jaws and constructed of impression material sufficiently hard not to soften at mouth temperature, covering the occlusal surface of said bite rim with similar warm impression material, placing the said bite rim in the mouth, forming a compound ridge impression on said covering and occlusal surface by causing the patient to bite in centric relation, rechecking said bite after removing and replacing said bite plate in the patient's mouth for true centric relation, then carefully checking the relationship of the cusps and sulci of the opposing teeth with the said trial plate in the mouth by determining during lateral and protrusive excursions of the patient's mandible whether the cusps and sulci of the opposing teeth engage the compound ridges of the occlusal surface of the bite plate, then correcting the cusps and sulci of said opposing teeth by trimming cusps or deepening sulci until proper engagement of posterior teeth with said compound ridges of the trial plate is present during all mandibular motions of the patient, then removing the trial plate and widening somewhat the occlusal surface and covering said widened occlusal surface with a thin layer of very soft impression material, then generating a compound functional occlusal path in the soft impression material over and in cooperation with the compound ridges of the bite rim by all possible mandibular movements of the patient with the covered trial plate replaced in the mouth and with pressure from the opposing teeth against the soft impression material, the relative movement of said cusps and sulci of said opposing teeth generating such compound occlusal path, then removing the trial plate with the path therein and pouring in hard material a counterpart of said path which is made up of compound ridges and completing the restorative by properly aligning the artificial dentures with said last mentioned compound ridges and grinding the occlusal surfaces of said artificial dentures in conformance with said compound ridges.

3. The method of preparing artificial dentures of the type built to whatever natural or artificial dentures are in the mouth, which consists in forming a compound ridge impression from the dentures in the mouth by causing the subject to bite in centric relation upon a trial bite plate formed to accurately fit the opposing arch of the mouth and having an occlusal surface constructed from self-hardening impression material conditioned to receive impressions at the time of said bite, permitting said occlusal surface of said trial bite plate to harden, then carefully checking the relationship of the cusps and sulci of the opposing teeth with the said trial plate in the mouth by determining during lateral and protrusive excursions of the subject's mandible whether the cusps and sulci of the opposing teeth engage the compound ridges of the occlusal surface of the bite plate, then correcting the cusps and sulci of said opposing teeth by trimming cusps or deepening sulci until proper engagement of posterior teeth with said compound ridges of the trial plate is present during all mandibular motions of the patient, then removing the trial plate and widening somewhat the occlusal surface and covering said widened occlusal surface with a thin layer of very soft impression material, then generating a compound functional occlusal path in the soft impression material over and in cooperation with the compound ridges of the bite rim by all possible mandibular movements of the subject with the covered trial plate replaced in the mouth and with pressure from the opposing teeth against the soft impression material, the relative movement of said cusps and sulci of said opposing teeth generating such compound occlusal path, then removing the trial plate with the path therein and pouring in hard material a counterpart of said path which is made up of compound ridges and completing the restoration by properly aligning the artificial dentures with said last mentioned compound ridges and grinding the occlusal surfaces of said artificial dentures in conformance with said compound ridges.

4. The steps in the method of preparing dental restoratives which consists in constructing a set of substantially rigid functional trial plates from plaster casts of the upper and lower jaws, said functional trial plates accurately fitting the respective arches of the mouth and having bite rims filled up for correct contour and height constructed from a relatively hard waxy substance which will not soften at mouth temperature, covering the occlusal surfaces of said bite rims, each with a layer of relatively soft moldable material, accurately placing the functional trial plates so made in the subject's mouth, shaping and molding by all possible mandibular movements of the subject a predetermined functional occlusal path on the occlusal surfaces of the soft coverings of said functional bite rims, reproducing the functional occlusal surfaces of said two functional trial plates in hard material by molding.

FREDERICK S. MEYER.